US009793568B2

(12) United States Patent
Oda et al.

(10) Patent No.: US 9,793,568 B2
(45) Date of Patent: Oct. 17, 2017

(54) SOLID POLYMER ELECTROLYTE FUEL CELL

(75) Inventors: Masaru Oda, Utsunomiya (JP); Nagayuki Kanaoka, Utsunomiya (JP); Shunsuke Itami, Saitama (JP); Ryohei Ishimaru, Sumida-ku (JP); Masaaki Sakano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 913 days.

(21) Appl. No.: 12/890,186

(22) Filed: Sep. 24, 2010

(65) Prior Publication Data

US 2011/0070516 A1   Mar. 24, 2011

(30) Foreign Application Priority Data

Sep. 24, 2009  (JP) ................. 2009-218895

(51) Int. Cl.
| | |
|---|---|
| *H01M 8/02* | (2016.01) |
| *H01M 8/241* | (2016.01) |
| *H01M 8/2457* | (2016.01) |
| *H01M 8/2483* | (2016.01) |
| *H01M 8/0267* | (2016.01) |
| *H01M 8/0258* | (2016.01) |
| *H01M 8/1007* | (2016.01) |

(52) U.S. Cl.
CPC ......... *H01M 8/241* (2013.01); *H01M 8/0258* (2013.01); *H01M 8/0267* (2013.01); *H01M 8/1007* (2016.02); *H01M 8/2457* (2016.02); *H01M 8/2483* (2016.02)

(58) Field of Classification Search
CPC ............ H01M 4/86; H01M 4/88; H01M 4/90; H01M 8/0258; H01M 8/026; H01M 8/0263; H01M 8/241; H01M 8/2457; H01M 8/2483; H01M 8/0267; H01M 8/1007
USPC ........................................ 429/523
See application file for complete search history.

(56) References Cited

U.S. PATENT DOCUMENTS

| | | | |
|---|---|---|---|
| 8,003,278 B2 | 8/2011 | Ushio et al. | |
| 8,110,316 B2 | 2/2012 | Oda et al. | |
| 2002/0192533 A1* | 12/2002 | Gebhardt et al. | ............... 429/40 |

(Continued)

FOREIGN PATENT DOCUMENTS

| | | |
|---|---|---|
| CN | 101312250 | 11/2008 |
| JP | 2000-277128 | 10/2000 |
| JP | 2004-253185 | 9/2004 |

(Continued)

OTHER PUBLICATIONS

Machine Translation of JP 2007-234543.*

(Continued)

*Primary Examiner* — Stephen Yanchuk
(74) *Attorney, Agent, or Firm* — Nelson Mullins Riley & Scarbrough LLP; Anthony A. Laurentano (57) ABSTRACT

A fuel cell is formed by sandwiching a membrane electrode assembly between a first separator and a second separator. The membrane electrode assembly includes a cathode, an anode, and a solid polymer electrolyte membrane interposed between the cathode and the anode. In the membrane electrode assembly, a catalyst area of an electrode catalyst layer of the cathode and an electrode catalyst layer of the anode terminates at a position spaced upwardly from lower ends of an oxygen-containing gas flow field and a fuel gas flow field.

5 Claims, 6 Drawing Sheets

(56) References Cited

U.S. PATENT DOCUMENTS

2004/0175606 A1* 9/2004 Komura et al. ............... 429/34
2007/0259242 A1* 11/2007 Schaevitz ........... H01M 8/1286
　　　　　　　　　　　　　　　　　　　　　　　429/432

FOREIGN PATENT DOCUMENTS

JP　　　2007-234352　　9/2007
JP　　　2007-234543　　9/2007

OTHER PUBLICATIONS

Japanese Office Action for Application No. 2009-218895, dated Aug. 16, 2011.
Japanese Office Action for Application No. 2009-218895, 3 pages, dated Apr. 24, 2012.
Chinese Office Action for Application No. 201010283710.1, 8 pages, dated Nov. 2, 2012.

* cited by examiner

SOLID POLYMER ELECTROLYTE FUEL CELL

CROSS-REFERENCE TO RELATED APPLICATION

This application is based upon and claims the benefit of priority from Japanese Patent Application No. 2009-218895 filed on Sep. 24, 2009, of which the contents are incorporated herein by reference.

BACKGROUND OF THE INVENTION

Field of the Invention

The present invention relates to a solid polymer electrolyte fuel cell formed by stacking a membrane electrode assembly and a separator. The membrane electrode assembly includes a pair of electrodes, and an electrolyte membrane interposed between the electrodes.

Description of the Related Art

For example, a solid polymer electrolyte fuel cell employs a membrane electrode assembly (MEA) which includes an anode, a cathode, and an electrolyte membrane interposed between the anode and the cathode. The electrolyte membrane is a solid polymer ion exchange membrane. The membrane electrode assembly and separators sandwiching the membrane electrode assembly make up a power generation unit. In this type of fuel cell, in use, generally, a predetermined number of, e.g., several hundreds of power generation units are stacked together to form a fuel cell stack, e.g., mounted in a vehicle.

In the fuel cell, electricity is generated by electrochemical reactions of a fuel gas (e.g., gas chiefly containing hydrogen) supplied to the anode through a fuel gas flow field and an oxygen-containing gas (e.g., gas chiefly containing oxygen or the air) supplied to the cathode through an oxygen-containing gas flow field.

In the structure, at the time of power generation operation in the fuel cell, water is produced at the cathode, and back diffusion of the water toward the anode may occur. Therefore, condensed water tends to be retained downstream of the oxygen-containing gas flow field and the fuel gas flow field. In an area where the end of the electrode is overlapped with a water retention area, the electrolyte membrane may be swelled significantly to cause cross leakage of the fuel gas to the cathode. Therefore, the electrolyte membrane may be degraded undesirably.

As an attempt to address the problem, a cell unit of a fuel cell disclosed in Japanese Laid-Open Patent Publication No. 2007-234352 is known. This cell unit includes a membrane electrode assembly and a pair of separators made of electrically conductive material, sandwiching the membrane electrode assembly. The membrane electrode assembly includes an electrolyte membrane, a cathode joined to one surface of the electrolyte membrane, and an anode joined to the other surface of the electrolyte membrane. The air is supplied to the cathode, and the fuel is supplied to the anode. An air chamber is formed between the cathode and one of the separators, and a fuel chamber is formed between the anode and the other of the separators.

A throttle section having a reduced sectional area as a fluid passage is provided at the outlet of at least one of the air chamber and the fuel chamber. Therefore, in the air chamber, the air is discharged through the outlet at a higher speed, and water droplets in the water chamber are removed suitably. According to the disclosure, in the cell unit, even if the operating condition is changed, the supply of the air to the cathode is not disturbed easily, and the cell voltage is stabilized.

However, in Japanese Laid-Open Patent Publication No. 2007-234352, since the throttle section is provided at the outlet of at least one of the air chamber and the fuel chamber, the pressure loss is increased at this throttle section, and the efficiency in the fuel cell system is lowered. Further, the structure of the fuel cell system is complicated, and the production cost becomes high.

SUMMARY OF THE INVENTION

The present invention has been made to solve the problems of this type, and an object of the present invention is to provide a solid polymer electrolyte fuel cell having simple and economical structure in which overlapping of a water retention area of a reactant gas flow field and an end of an electrode is prevented, and degradation of an electrolyte membrane is prevented as much as possible.

The present invention relates to a solid polymer electrolyte fuel cell formed by stacking a membrane electrode assembly and a separator. The membrane electrode assembly includes a pair of electrodes, and an electrolyte membrane interposed between the electrodes.

The separator includes a reactant gas flow field for allowing a reactant gas to flow in a direction of gravity along a surface of the separator, and an outlet buffer connected to a lower end of the reactant gas flow field. In the membrane electrode assembly, a catalyst area of the electrode terminates at a position spaced upwardly from the lower end of the reactant gas flow field.

In the present invention, the catalyst area of the electrode terminates at a position spaced upwardly from the lower end of the reactant gas flow field. In the structure, it is possible to reliably prevent overlapping of the water retention area of the reactant gas flow field and the end of the electrode. Thus, with simple and economical structure, degradation of the electrolyte membrane is prevented as much as possible.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
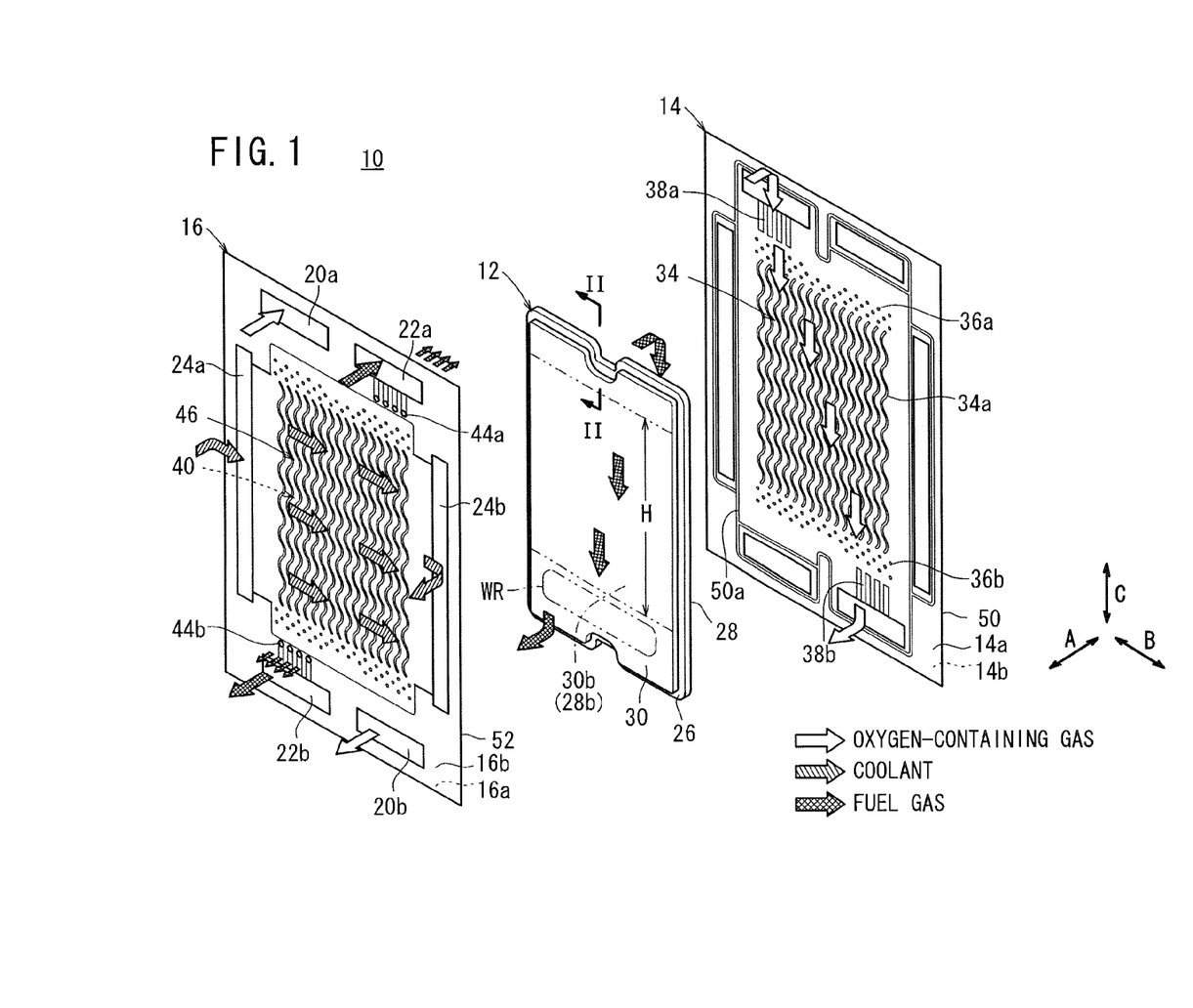
FIG. 1 is an exploded perspective view showing main components of a fuel cell according to a first embodiment of the present invention.

As shown in FIG. 1, a fuel cell 10 according to a first embodiment of the present invention is formed by sandwiching a membrane electrode assembly 12 between a first separator 14 and a second separator 16.

At an upper end of the fuel cell 10 in a longitudinal direction indicated by an arrow C, an oxygen-containing gas supply passage 20a for supplying an oxygen-containing gas and a fuel gas supply passage 22a for supplying a fuel gas such as a hydrogen-containing gas are provided. The oxygen-containing gas supply passage 20a and the fuel gas supply passage 22a extend through the fuel cell 10 in the direction indicated by an arrow A.

At a lower end of the fuel cell 10 in the longitudinal direction indicated by the arrow C, a fuel gas discharge passage 22b for discharging the fuel gas and an oxygen-containing gas discharge passage 20b for discharging the oxygen-containing gas are provided. The fuel gas discharge passage 22b and the oxygen-containing gas discharge passage 20b extend through the fuel cell 10 in the direction indicated by the arrow A.

At one end of the fuel cell 10 in a lateral direction indicated by an arrow B, a coolant supply passage 24a for supplying a coolant is provided. At the other end of the fuel cell 10 in the lateral direction indicated by the arrow B, a coolant discharge passage 24b for discharging the coolant is provided. The coolant supply passage 24a and the coolant discharge passage 24b extend through the fuel cell 10 in the direction indicated by the arrow A.

Figure 2:
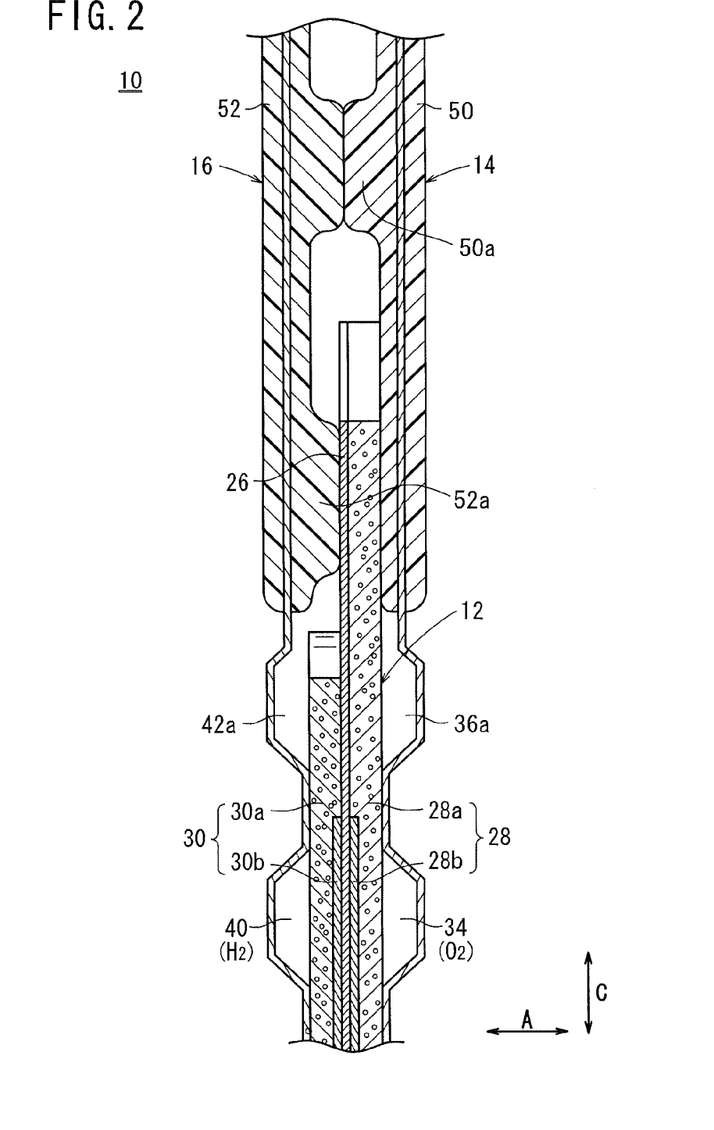
FIG. 2 is a cross sectional view showing the fuel cell, taken along a line II-II in FIG. 1.
Figure 3:
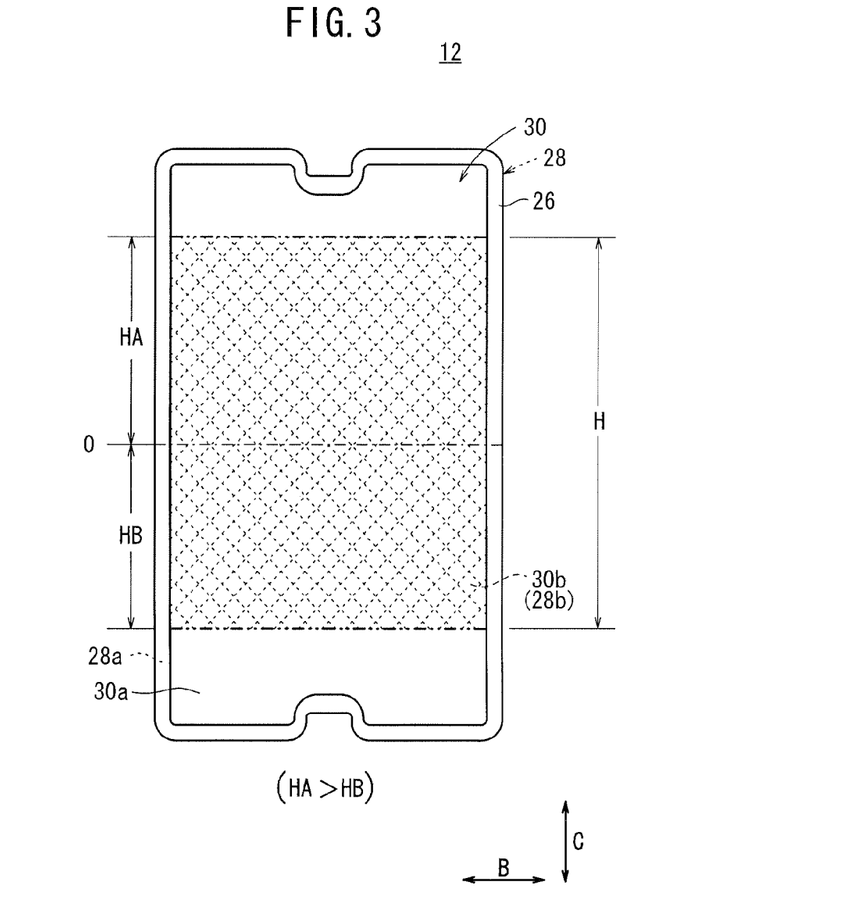
FIG. 3 is a front view showing a membrane electrode assembly of the fuel cell.

As shown in FIGS. 1 to 3, the membrane electrode assembly 12 includes a cathode (first electrode) 28, an anode (second electrode) 30, and a solid polymer electrolyte membrane 26 interposed between the cathode 28 and the anode 30. The solid polymer electrolyte membrane 26 is formed by impregnating a thin membrane of perfluorosulfonic acid with water, for example. The surface area of the anode 30 is smaller than the surface areas of the cathode 28 and the solid polymer electrolyte membrane 26. That is, the membrane electrode assembly 12 is constructed as a so-called stepped-type MEA.

As shown in FIG. 2, the cathode 28 has a gas diffusion layer 28a such as a carbon paper, and an electrode catalyst layer 28b of platinum alloy supported on porous carbon particles. The carbon particles are deposited uniformly on the surface of the gas diffusion layer 28a. The anode 30 has a gas diffusion layer 30a such as a carbon paper, and an electrode catalyst layer 30b of platinum alloy supported on porous carbon particles. The carbon particles are deposited uniformly on the surface of the gas diffusion layer 30a.

The electrode catalyst layers 28b, 30b are provided on both surfaces of the solid polymer electrolyte membrane 26, respectively. As described later, the electrode catalyst layers 28b, 30b are formed within a predetermined catalyst area H where a catalyst is applied, on both surfaces of the solid polymer electrolyte membrane 26 (see FIG. 3).

For example, the first separator 14 and the second separator 16 are elongated metal plates such as steel plates, stainless steel plates, aluminum plates, plated steel sheets, or metal plates having anti-corrosive surfaces by surface treatment. Each of the first separator 14 and the second separator 16 has an elongated rectangular shape in a plan view, and is formed by corrugating a metal thin plate under pressure to have a concave-convex shape in cross section. Instead of using the metal separators, carbon separators may be used as the first separator 14 and the second separator 16.

As shown in FIG. 1, the first separator 14 has an oxygen-containing gas flow field 34 on its surface 14a facing the membrane electrode assembly 12. The oxygen-containing gas flow field 34 is connected to the oxygen-containing gas supply passage 20a and the oxygen-containing gas discharge passage 20b. The oxygen-containing gas flow field 34 includes a plurality of corrugated flow grooves 34a extending in the direction of gravity indicated by the arrow C. An inlet buffer 36a is provided adjacent to the inlet of the oxygen-containing gas flow field 34, and an outlet buffer 36b is provided adjacent to the outlet of the oxygen-containing gas flow field 34. A plurality of bosses are provided in each of the inlet buffer 36a and the outlet buffer 36b.

A plurality of inlet connection grooves 38a are formed between the inlet buffer 36a and the oxygen-containing gas supply passage 20a. A plurality of outlet connection grooves 38b are formed between the outlet buffer 36b and the oxygen-containing gas discharge passage 20b.

Figure 4:
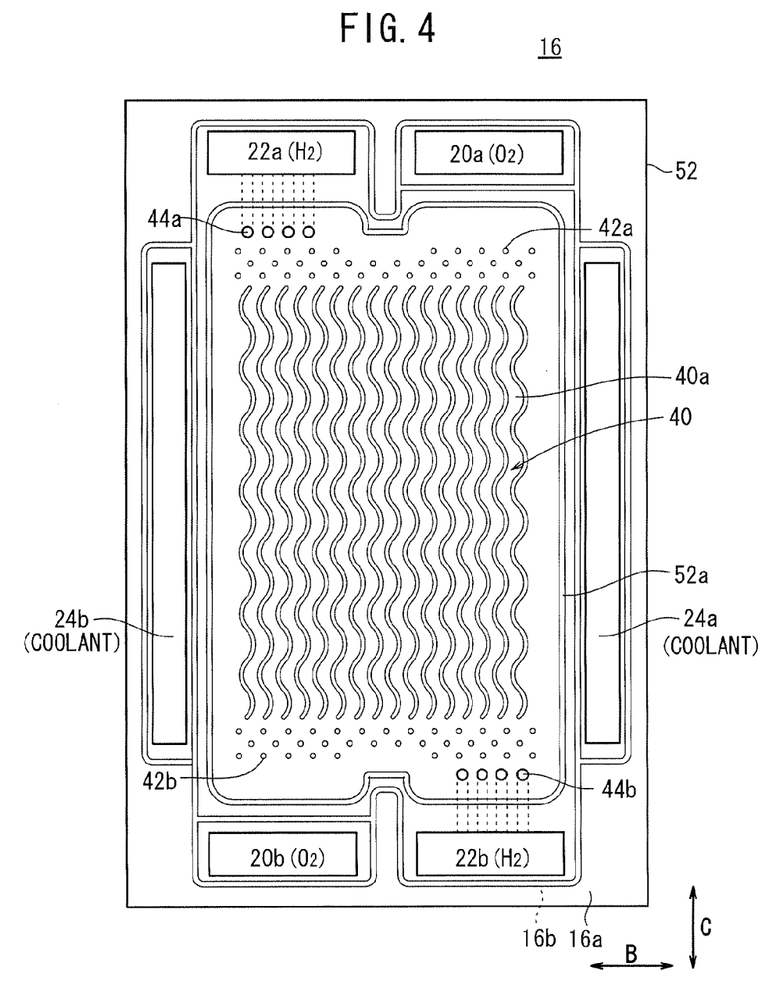
FIG. 4 is a front view showing a second separator of the fuel cell.

As shown in FIG. 4, the second separator 16 has a fuel gas flow field 40 on its surface 16a facing the membrane electrode assembly 12. The fuel gas flow field 40 is connected to the fuel gas supply passage 22a and the fuel gas discharge passage 22b. The fuel gas flow field 40 has a plurality of corrugated flow grooves 40a extending in the direction indicated by the arrow C. An inlet buffer 42a is provided adjacent to the inlet of the fuel gas flow field 40, and an outlet buffer 42b is provided adjacent to the outlet of the fuel gas flow field 40. A plurality of bosses are provided in each of the inlet buffer 42a and the outlet buffer 42b.

The second separator 16 has a plurality of supply holes 44a connecting the fuel gas supply passage 22a and the fuel gas flow field 40, and a plurality of discharge holes 44b connecting the fuel gas discharge passage 22b and the fuel gas flow field 40.

As shown in FIG. 1, a coolant flow field 46 is formed between a surface 14b of the first separator 14 and a surface 16b of the second separator 16. The coolant flow field 46 is connected to the coolant supply passage 24a and the coolant discharge passage 24b. The coolant flow field 46 includes flow grooves (not shown) formed by overlapping the back surface of the corrugated flow grooves 34a and the back surface of the corrugated flow grooves 40a, and the flow grooves extend in the direction indicated by the arrow B.

As shown in FIGS. 1 and 2, a first seal member 50 is formed integrally with the surfaces 14a, 14b of the first separator 14, around the outer end of the first separator 14. Alternatively, a member separate from the first separator 14 may be provided as the first seal member 50 provided on the surfaces 14a, 14b of the first separator 14, around the outer end of the first separator 14. A second seal member 52 is formed integrally with the surfaces 16a, 16b of the second separator 16, around the outer end of the second separator 16. Alternatively, a member separate from the second separator 16 may be provided as the second seal member 52 provided on the surfaces 16a, 16b of the second separator 16, around the outer end of the second separator 16.

The first seal member 50 includes a ridge 50a formed in spaces around the membrane electrode assembly 12 such that the oxygen-containing gas supply passage 20a and the oxygen-containing gas discharge passage 20b are connected to the oxygen-containing gas flow field 34. As shown in FIGS. 2 and 4, the second seal member 52 includes a ridge 52a that contacts the outer end of the solid polymer electrolyte membrane 26 of the membrane electrode assembly 12.

Figure 5:
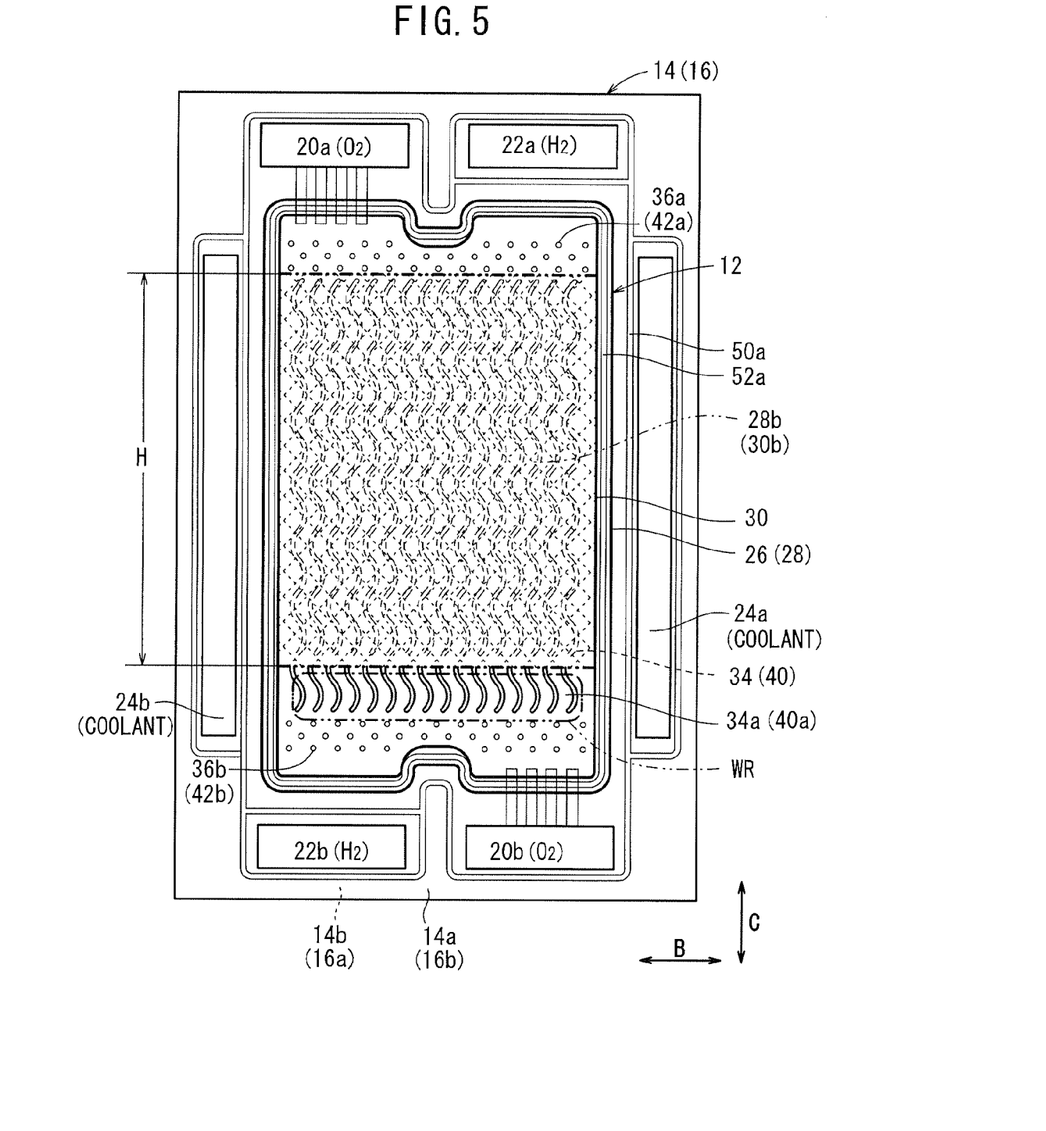
FIG. 5 is a view showing the relationship between a catalyst area of the membrane electrode assembly where a catalyst is applied and a reactant gas flow field.

As shown in FIG. 5, in the membrane electrode assembly 12, the catalyst area H of the electrode catalyst layers 28b, 30b terminates at a position spaced upwardly from lower ends of the oxygen-containing gas flow field 34 and the fuel gas flow field 40.

Specifically, an upper end of the catalyst area H of the electrode catalyst layers 28b, 30b and upper ends of the oxygen-containing gas flow field 34 and the fuel gas flow field 40 are provided at the same level, and the lower end of the catalyst area H of the electrode catalyst layers 28b, 30b is positioned above the lower ends of the oxygen-containing gas flow field 34 and the fuel gas flow field 40. Preferably, positions of the lower ends of the electrode catalyst layers 28b, 30b are shifted from each other for preventing concentration of the water on the front and back of the solid polymer electrolyte membrane 26.

As shown in FIG. 3, in the membrane electrode assembly 12, the upper part HA of the catalyst area H positioned above a central position O in the longitudinal direction and the direction of gravity is larger than the lower part HB of the catalyst area H (HA>HB). In the membrane electrode assembly 12, each of the gas diffusion layers 28a, 30a is vertically symmetrical, and is not symmetrical with respect to the central position O.

Next, operation of the fuel cell 10 will be described below.

Firstly, as shown in FIG. 1, an oxygen-containing gas is supplied to the oxygen-containing gas supply passage 20a, and a fuel gas such as a hydrogen-containing gas is supplied to the fuel gas supply passage 22a. Further, a coolant such as pure water, ethylene glycol, or oil is supplied to the coolant supply passage 24a.

Thus, the oxygen-containing gas flows from the oxygen-containing gas supply passage 20a into the oxygen-containing gas flow field 34 through the inlet connection grooves 38a of the first separator 14. In the structure, the oxygen-containing gas moves in the direction of gravity indicated by the arrow C along the oxygen-containing gas flow field 34, and the oxygen-containing gas is supplied to the cathode 28 of the membrane electrode assembly 12 for inducing an electrochemical reaction at the cathode 28.

The fuel gas from the fuel gas supply passage 22a flows through the supply holes 44a, and moves toward the surface 16a of the second separator 16. As shown in FIG. 4, the fuel gas flows along the fuel gas flow field 40 in the direction of gravity indicated by the arrow C, and the fuel gas is supplied to the anode 30 of the membrane electrode assembly 12 for including an electrochemical reaction at the anode 30 (FIG. 1).

Thus, in the membrane electrode assembly 12, the oxygen-containing gas supplied to the cathode 28, and the fuel gas supplied to the anode 30 are partially consumed in electrochemical reactions at catalyst layers of the cathode 28 and the anode 30 for generating electricity.

Then, the oxygen-containing gas supplied to and partially consumed at the cathode 28 of the membrane electrode assembly 12 is discharged along the oxygen-containing gas discharge passage 20b in the direction indicated by the arrow A. The fuel gas supplied to and partially consumed at the anode 30 of the membrane electrode assembly 12 flows through the discharge holes 44b, and moves toward the surface 16b of the second separator 16. The fuel gas is discharged from the surface 16b into the fuel gas discharge passage 22b.

Further, as shown in FIG. 1, the coolant supplied to the coolant supply passage 24a flows into the coolant flow field 46 formed between the first separator 14 of one of the adjacent fuel cells 10 and the second separator 16 of the other of the adjacent fuel cells 10. In the structure, the coolant supplied from the coolant supply passage 24a to the coolant flow field 46 moves in the direction indicated by the arrow B to cool the fuel cells 10, and the coolant is discharged to the coolant discharge passage 24b.

In the first embodiment, as shown in FIG. 5, the catalyst area H of the electrode catalyst layers 28b, 30b terminates at a position spaced upwardly from the lower ends (borders with the outlet buffers 36b, 42b) of the oxygen-containing gas flow field 34 and the fuel gas flow field 40.

In the structure, it is possible to reliably prevent overlapping of a water retention area WR which tends to be formed downstream of the oxygen-containing gas flow field 34 and the fuel gas flow field 40 and the catalyst area H of the electrode catalyst layers 28b, 30b.

Therefore, in the membrane electrode assembly 12, excessive swelling of the solid polymer electrolyte membrane 26 due to the water in the water retention area WR does not occur. It becomes possible to prevent cross leakage of a large amount of the fuel gas to the cathode 28.

Thus, with simple and economical structure, degradation of the solid polymer electrolyte membrane 26 is prevented as much as possible. Therefore, it is possible to reliably avoid degradation in the power generation performance of the fuel cells 10, and interruption of power generation due to damages of the solid polymer electrolyte membrane 26.

Figure 6:
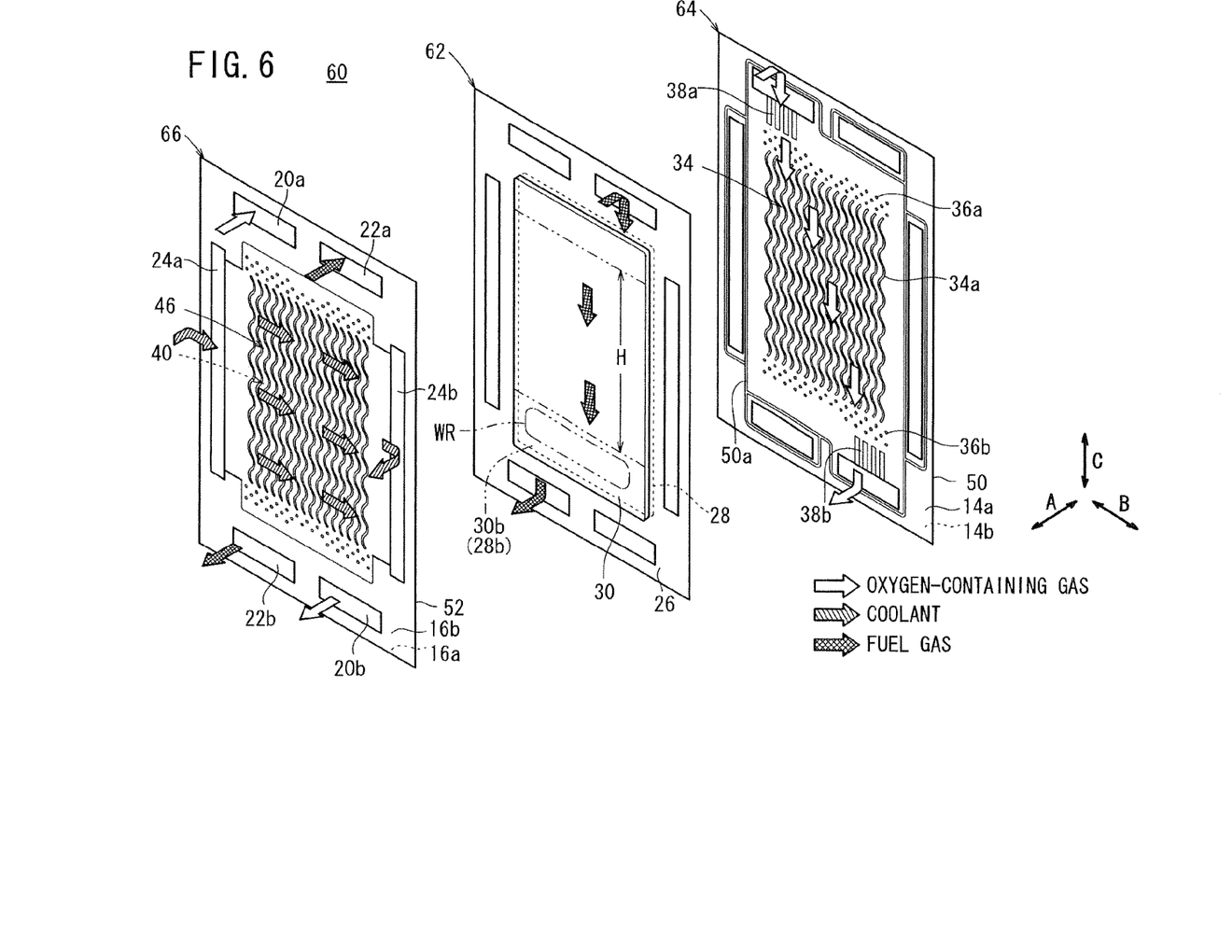
FIG. 6 is an exploded perspective view showing main components of a fuel cell according to a second embodiment of the present invention.

FIG. 6 is an exploded perspective view showing main components of a fuel cell 60 according to a second embodiment of the present invention. The constituent elements that are identical to those of the fuel cell 10 according to the first embodiment are labeled with the same reference numeral, and description thereof will be omitted.

The fuel cell 60 is formed by stacking a membrane electrode assembly 62 between a first separator 64 and a second separator 66. The membrane electrode assembly 62 includes a cathode 28, an anode 30, and a solid polymer electrolyte membrane 26 interposed between the cathode 28 and the anode 30. The surface area of the cathode 28 and the surface area of the anode 30 are the same. The surface area of the solid polymer electrolyte membrane 26 is larger than the surface areas of the cathode 28 and the anode 30.

In the membrane electrode assembly 62, a catalyst area H of the electrode catalyst layers 28b, 30b where a catalyst is applied terminates at a position spaced upwardly from lower ends of the oxygen-containing gas flow field 34 and the fuel gas flow field 40, i.e., a position spaced upwardly from a water retention area WR.

In the second embodiment, the same advantages as in the case of the first embodiment are obtained. For example, excessive swelling of the solid polymer electrolyte membrane 26 due to the water in the water retention area WR does not occur. With the simple and economical structure, degradation of the solid polymer electrolyte membrane 26 is prevented as much as possible.

In the first and second embodiments, gas flow fields such as the oxygen-containing gas flow field 34 have corrugated grooves. Alternatively, the gas flow fields may have straight grooves. Further, the end of the catalyst layer may or may not be straight.

While the invention has been particularly shown and described with reference to preferred embodiments, it will be understood that variations and modifications can be effected thereto by those skilled in the art without departing from the spirit of the invention as defined by the appended claims.

What is claimed is:

1. A solid polymer electrolyte fuel cell, comprising:
   a first membrane electrode assembly stacked with a separator, the membrane electrode assembly including a pair of electrodes, and an electrolyte membrane interposed between the electrodes, and the separator comprising:
   a reactant gas flow field defined by a plurality of flow grooves extending in an upstream to downstream direction for allowing a reactant gas to flow from the upstream to downstream direction along a surface of the separator, the reactant gas flow field defining a first end positioned at a most downstream portion of the reactant gas flow field and a second end positioned at a most upstream portion of the reactant gas flow field; and an outlet buffer positioned downstream of the first end of the reactant gas flow field and being in fluid communication with the first end of the reactant gas flow field, an inlet buffer and the reactant gas flow field is located between the inlet buffer and the outlet buffer, said reactant gas flow field being in fluid communication with both the inlet buffer and the outlet buffer;

wherein, in the first membrane electrode assembly, a catalyst area of the electrode where a catalyst is applied comprises an uppermost edge located upstream from a lowermost edge that is located downstream from the uppermost edge, wherein the lowermost edge terminates at a terminating-position located upstream of the first end of the reactant gas flow field;

wherein, in the first membrane electrode assembly, an upper part of the catalyst area positioned upstream of a central position in the upstream to downstream direction is defined by a first length between the uppermost edge of the catalyst area and the central position, and a lower part of the catalyst area positioned downstream of the central position is defined by a second length between the lowest edge of the catalyst area and the central position; wherein the central position is a position dividing the first membrane electrode assembly equally in the upstream to downstream direction and the first length is larger than the second length, the uppermost edge of the catalyst area and the second end of the reactant gas flow field are provided at the same level; and wherein the reactant flow field has a length "L" defined by a distance between the inlet buffer and the outlet buffer along a common flow path, and the catalyst area has a length "l" along the common flow path; wherein the length "L" is greater than the length "l".

2. The solid polymer electrolyte fuel cell according to claim 1, wherein, in the membrane electrode assembly, the uppermost edge of the catalyst area and the second end of the reactant gas flow field are provided at the same level.

3. The solid polymer electrolyte fuel cell according to claim 1, wherein the reactant gas flow field is oriented such that the reactant gas flows in the direction of gravity when the fuel cell is mounted.

4. The solid polymer electrolyte fuel cell according to claim 1, wherein the catalyst area is defined by a first electrode catalyst layer adjacent to one of the pair of electrodes and a second electrode catalyst layer adjacent to another one of the pair of electrodes, and wherein a lowest edge of the first electrode catalyst area is shifted from a lowest edge of the second electrode.

5. The solid polymer electrolyte fuel cell according to claim 1, wherein the plurality of flow grooves comprise corrugated flow grooves.

* * * * *